United States Patent
Nagashima

(10) Patent No.: US 8,005,673 B2
(45) Date of Patent: Aug. 23, 2011

(54) VOICE RECOGNITION DEVICE, VOICE RECOGNITION METHOD, AND VOICE RECOGNITION PROGRAM

(75) Inventor: Hisayuki Nagashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 721 days.

(21) Appl. No.: 12/104,982

(22) Filed: Apr. 17, 2008

(65) Prior Publication Data

US 2009/0326936 A1    Dec. 31, 2009

(30) Foreign Application Priority Data

Apr. 17, 2007    (JP) ................................ 2007-108037

(51) Int. Cl.
*G10L 15/20* (2006.01)
(52) U.S. Cl. ........ 704/235; 704/231; 704/251; 704/270; 704/270.1; 704/275
(58) Field of Classification Search .................. 704/235, 704/231, 251, 270, 270.1, 275
See application file for complete search history.

(56) References Cited

U.S. PATENT DOCUMENTS

| | | | | |
|---|---|---|---|---|
| 6,424,357 B1 * | 7/2002 | Frulla et al. | ................... | 715/728 |
| 7,035,805 B1 * | 4/2006 | Miller | ........................... | 704/275 |
| 2004/0143440 A1 * | 7/2004 | Prasad et al. | ................... | 704/270 |
| 2005/0125110 A1 * | 6/2005 | Potter et al. | ........................ | 701/1 |
| 2006/0206336 A1 * | 9/2006 | Gurram et al. | ................. | 704/275 |
| 2007/0005370 A1 * | 1/2007 | Elshout | .......................... | 704/275 |

FOREIGN PATENT DOCUMENTS

JP    2004-234273    8/2004

* cited by examiner

*Primary Examiner* — Qi Han
(74) *Attorney, Agent, or Firm* — Arent Fox, LLP

(57) ABSTRACT

A voice recognition device, method, and program for operating a plurality of control objects recognizing a plurality of user-provided verbal commands. The voice recognition device determines a control object and control content from predefined types of control objects and contents, based on a recognition result of the input verbal command. A voice recognition unit converts input verbal commands into a text expressed with a series of words, a first parsing unit performs an identification process of a first control candidate group as a control candidate for the control object and control content, a second parsing unit performs an identification process of a second control candidate group as a control candidate for the control object and control content, and a control candidate identification unit identifies a final control candidate group for determining the control object and control content from the first control candidate group and the second control candidate group.

11 Claims, 10 Drawing Sheets

FIG.6

| <Text> | turn | on | the | radio | and | temperature | up |
|---|---|---|---|---|---|---|---|
| Uni-gram | Audio Radio On 0.2 | Ambiguous OnOff On 0.1 | Ambiguous 0.05 | Audio Radio On 0.1 | Navigation 0.05 | Climate Temperature Value 0.4 | Ambiguous UpDown Up 0.3 |
| Bi-gram | Ambiguous OnOff On 0.3 | Ambiguous 0.01 | | Audio Radio On 0.3 | Climate Temperature Value 0.1 | Climate Temperature Up 0.4 | |
| Tri-gram | | Ambiguous OnOff On 0.2 | Audio Radio On 0.1 | Audio Radio 0.05 | Audio 0.02 | Climate Temperature Up 0.3 | |

| Ranking | Control candidate | Parsing score |
|---|---|---|
| 1 | Audio_Radio_On | 0.7 |

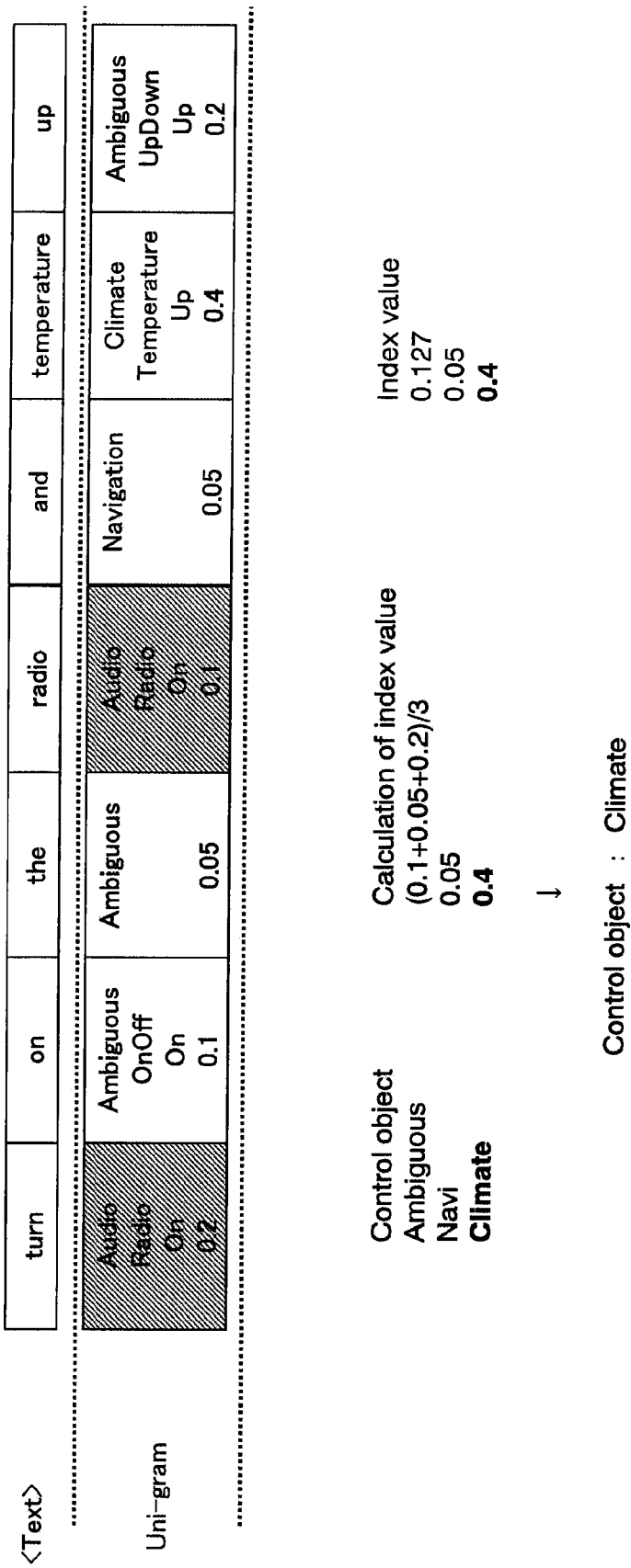

FIG.8

| \<Text\> | turn | on | the | radio | and | temperature | up |
|---|---|---|---|---|---|---|---|
| Uni-gram | Climate AC OnOff On 0.2 | Ambiguous OnOff On 0.1 | Ambiguous 0.05 | - 0.0 | Ambiguous 0.05 | Climate Temperature Value 0.4 | Ambiguous UpDown Up 0.3 |
| Bi-gram | | Ambiguous OnOff On 0.3 | Ambiguous 0.01 | - 0.0 | - 0.0 | Climate Temperature Value 0.1 | Climate Temperature Up 0.4 |
| Tri-gram | | | Climate AC OnOff On 0.2 | - 0.0 | - 0.0 | - 0.0 | Climate Temperature Up 0.3 |

Ranking    Control candidate    Parsing score
1    Climate_Temperature_Up    0.7
2    Climate_Temperature_Value    0.5
3    Climate_AC_OnOff_On    0.4

→

The second control candidate group : Climate_Temperature_Up

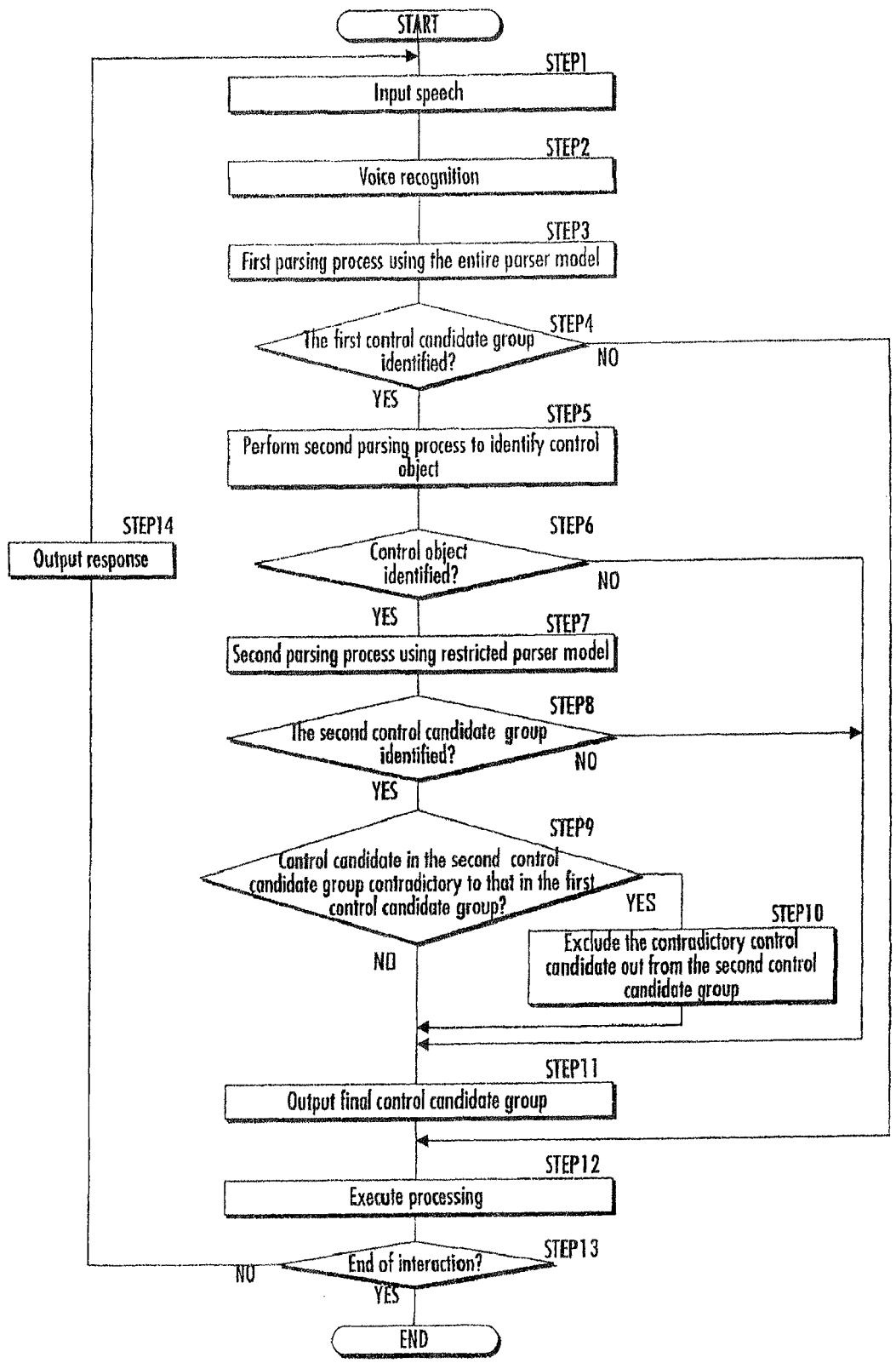

FIG.10

| First control candidate group | Contradictory second control candidates |
|---|---|
| Audio_Radio_On | Ambiguous_Cancel |
| | Ambiguous_Back |
| | Audio_OnOff_Off |
| | Audio_CD_Play |
| Audio_CD_Play | Ambiguous_Cancel |
| | Ambiguous_Back |
| | Audio_OnOff_Off |
| | Audio_Radio_On |
| Navigation_Screen_Audio | Navigation_Screen_Off |
| | Navigation_Screen_Climate |
| | Navigation_Screen_Map |
| | Navigation_Screen_Setup |
| | Navigation_Screen_Information |
| | Navigation_Screen_Menu |
| ⋮ | ⋮ |

VOICE RECOGNITION DEVICE, VOICE RECOGNITION METHOD, AND VOICE RECOGNITION PROGRAM

BACKGROUND OF THE INVENTION

1. Field of the Invention

The present invention relates to a voice recognition device, a voice recognition method and a voice recognition program for determining a control object and control content thereof based on a recognition result of voice input from a user.

2. Description of the Related Art

In recent years, there has been used, for example, in a system in which a user operates an apparatus or the like, a voice recognition device which obtains information (commands including control objects and control contents) necessary for operating the apparatus or the like by recognizing a verbal command provided by a user. This type of voice recognition device interacts with a user by recognizing a verbal command (speech) from the user and responds to the user based on a recognition result of the verbal command to prompt the user to provide the next verbal command. The information necessary for operating the apparatus or the like is obtained from a recognition result of the interaction with the user.

The recognition device is provided, for example, on a vehicle, and the user operates a plurality of apparatuses such as an audio system, navigation system, air conditioner, and the like, mounted to the vehicle. Furthermore, these apparatuses are highly advanced in functions. For example, a navigation system has a plurality of functions that include a map display and a POI (Point of Interest) search, and these functions are operated by the user. However, when there are plural control objects (for example, applications installed in the navigation system) for a user to operate, it is redundant for the user to input voice speeches one by one, which will be recognized, respectively, as a command for operating each of the applications, and is, therefore, not convenient. Accordingly, there has been disclosed a device in which a plurality of applications are preliminarily provided in correspondence with a command. The plurality of applications are operated by a user by inputting the command using their voice only once (for example, refer to Japanese Patent Laid-open No. 2004-234273, hereinafter referred to as JP '273).

The voice recognition device (interactive terminal device) disclosed in JP '273 has a local command for use in operating an application with which the user is interacting, and a global command for use in operating applications other than the application with which the user is interacting as commands to be recognized. The voice recognition device then determines whether the input speech is a local command and performs a voice recognition process by taking the input speech as a local command if the input speech is determined to be a local command; otherwise, the voice recognition process will be performed by taking the input speech as a global command. In this case, since a global command is preliminarily provided in correspondence with more than one application, the voice recognition device, with respect to the input global command, performs a process corresponding to the recognized global command in all applications in correspondence with a global command.

However, for the voice recognition device in JP '273, it is necessary to prepare a command in correspondence with a plurality of applications for use by a user. Therefore, plural commands must be provided in correspondence with an arbitrarily ordered combination of a plurality of applications for a user if the user intends to operate the arbitrarily ordered combination of the plurality of applications with a single voice command. The device disclosed in JP '273 has a disadvantage, however, as it is not user-friendly.

Thus, it is preferable to recognize a command for operating each application via a single voice command that is input when a user intends to operate a plurality of applications. In other words, without preliminarily providing a voice command corresponding to a plurality of applications, it is possible to operate the arbitrarily ordered combination of a plurality of applications by recognizing a plurality of commands via the input of a single voice command. However, it is not possible for the voice recognition device disclosed in JP'273 to handle such a case when a plurality of commands are included in a single voice input since there is only one command that may be recognized from the single voice input in the voice recognition device disclosed in JP '273.

SUMMARY OF THE INVENTION

The present invention has been accomplished in view of the aforementioned problems. It is therefore an aspect of the present invention to provide a voice recognition device, a voice recognition method, and a voice recognition program capable of operating a plurality of control objects by recognizing a plurality of commands accomplished during a single voice command that is input by a user.

According to a first aspect of the present invention, there is provided a voice recognition device which determines a control object, and control content thereof from predefined types of control objects and control contents thereof based on a recognition result of voice input from a voice input unit, including: a voice recognition unit for converting the input voice into a text expressed with a series of words by recognizing the input voice; a first parsing unit for performing an identification process of identifying a first control candidate group as a control candidate for the control object and control content thereof by parsing the text converted by the voice recognition unit; a second parsing unit for performing an identification process of identifying a second control candidate group as a control candidate for the control object and control content thereof by parsing the text converted by the voice recognition unit with respect to those control objects which are among the predefined types of control objects but not included in the first control candidate group; and a control candidate identification unit for identifying a final control candidate group for determining the control object and control content thereof from the first control candidate group and the second control candidate group.

In the voice recognition device described above, a verbal command for operating a control object from a user is input as a voice which is recognized by the voice recognition unit and converted to the text expressed with a series of words. Herein, the text has a meaningful component which is expressed with a series of words and has predefined meanings. Thus, by using a dictation method for dictating the input verbal command as text, it is possible for verbal commands that are not predetermined or known, and which are not limited to preliminarily defined commands, to be recognized. For example, the text is then parsed by the first parsing unit based on characteristics of a word or a series of words in the text. As a result, control candidates with a higher word score in the whole text are identified as the first control candidate group.

It is assumed that a plurality of commands referring to a plurality of control objects and control contents thereof should be input during a single voice input when a user intends to operate the plurality of control objects. In this case, the commands with a high word score among a plurality of commands input via voice by a user is identified as the first control candidate group by the first parsing unit. Then, the second parsing unit parses the text with respect to the control objects which are among the predefined types of control objects but are not included in the first control candidate group. As a result, the text is parsed after some commands identified as the first control candidate group have been excluded, and features for the other commands input via voice by the user may properly be extracted and identified as the second control candidate group.

Thereafter, the control candidate group for finally determining the control object and control content is then identified by the control candidate identification unit from the first control candidate group and the second control candidate group. Thus, even if a user inputs a plurality of verbal commands during a single voice input, it is possible for each of the plurality of commands to be included in the final candidate group. Therefore, according to the present invention, it is possible to operate a plurality of control objects by recognizing a plurality of verbal commands input at one time by a user.

It is preferable that the above-described voice recognition device include a calculation unit for calculating a word score based on features of words contained in the text converted by the voice recognition unit. It is also preferable that the above-described voice recognition device identify the second control candidate group by parsing the text with respect to those control objects which are among the predefined types of control objects, but not included in the first control candidate group, and whose each word score satisfies a predefined condition.

Herein, "score" refers to an index representing plausibility (i.e., likelihood or confidence factor) that a word or a series of words included in the text obtained as the recognition result of the input verbal command is relevant to the voice input from the acoustic or linguistic viewpoint, or the like. "Word score" is calculated for a word which acts as an object to be recognized based on, for example, a predefined appearance probability of the word. In other words, a word score for each control object works as an index representing a relevant degree between a word included in the text and each control object. Therefore, based on the word score for each control object, it is possible to determine whether a command relevant to a specific control object is left in the text. As a result, with respect to the control objects which are among the predefined types of control objects but are not included in the first control candidate group and whose word score satisfies a predefined condition, it is possible to identify the second control candidate group with higher accuracy by parsing the text.

It is preferable that the second parsing unit of the voice recognition device calculates an average value of word scores for the words which are contained in the text and correspond to the control objects, respectively, and use the average value as the predefined condition if the average value is not smaller than a predefined threshold value. For example, it is preferable for the second parsing unit to divide a total sum of word scores for control objects by numbers of the words included in the text and use it as the average value.

In this case, the average value for each word corresponding to each control object included in the text becomes an index representing an average of the relevant degree between each word and each control object and represents the relevant degree between the whole text and each control object. Therefore, in the case where the calculated average value is relatively large, there is a higher possibility that a command relating to a control object thereof be left in the text. Accordingly, it is possible to identify with higher accuracy, the second control candidate group by parsing the text with respect to the control objects which are among the predefined types of control objects, but not included in the first control candidate group, if the average value is not smaller than the predefined threshold value.

Furthermore, it is preferable that the above-described voice recognition device includes a discrepancy judging unit for judging whether or not each control candidate in the second control candidate group is contradictory to that in the first control candidate group for the control object and control content. It is also preferable that the second parsing unit excludes a control candidate out from the second control candidate group if the control candidate is judged by the discrepancy judging unit to be contradictory to that in the first control candidate group for the control object and control content thereof.

In other words, if the control candidate is judged by the discrepancy judging unit to be contradictory to that in the first control candidate group for the control object and control content, it is highly possible that the control candidate is wrongly identified. Therefore, it is possible to identify the second control candidate group with higher accuracy by removing the control candidate out of the second control candidate group.

It is preferable that the second parsing unit of the above-described voice recognition device exclude a control candidate from the second control candidate group if the control candidate can not be identified as a control object after the identification process is performed on the second control candidate group.

In other words, after the identification process is performed on the second control candidate group by the second parsing unit and a control candidate cannot be identified as a control object, the content of the control candidate is then not clear and it is highly possible that it has been wrongly identified. Therefore, by removing the second control candidate from the second control candidate group, it is possible to identify the second control candidate group with higher accuracy.

According to the present invention, a voice recognition method for determining a control object and control content thereof from predefined types of control objects and control contents based on a recognition result of input voice, includes: a voice recognition step of converting the input voice into a text expressed with a series of words by recognizing the input voice; a first parsing step of performing an identification process of identifying a first control candidate group as a control candidate for the control object and control content thereof by parsing the text converted in the voice recognition step; a second parsing step of performing an identification process of identifying a second control candidate group as a control candidate for the control object and control content thereof by parsing the text converted in the voice recognition step with respect to those control objects which are among the predefined types of control objects but not included in the first control candidate group; and a control candidate identifying step of identifying a final control candidate group for determining the control object and control content thereof from the first control candidate group and the second control candidate group.

According to the voice recognition method described above, as in the previously described voice recognition device, the text is parsed by the first parsing unit and the control candidates with a higher word score in the whole text are identified as the first control candidate group. Thereafter, by excluding the commands that have been identified as the first control candidate group, the text is parsed by the second parsing unit. As a result, features of the other commands input via voice from a user may be properly extracted and identified as the second control candidate group. Therefore, even if plural commands are input via voice from a user during a single voice input, it is possible for each command to be included in the final control candidate group. Thereby, according to the voice recognition method of the present invention, it is possible to recognize a plurality of commands from a single verbal command input by a user and operate a plurality of control objects.

Furthermore, according to the present invention, a voice recognition program causing a computer to execute a process of determining a control object and control content thereof from predefined types of control objects and control contents based on a recognition result of input voice, having a function to cause the computer to execute a voice recognition process of converting the input voice into a text expressed with a series of words by recognizing the input voice; a first parsing process of performing an identification process of identifying a first control candidate group as a control candidate for the control object and control content thereof by parsing the text converted by the voice recognition process; a second parsing process of performing an identification process of identifying a second control candidate group as a control candidate for the control object and control content thereof by parsing the text converted by the voice recognition process with respect to those control objects which are among the predefined types of control objects but not included in the first control candidate group; and a control candidate identification process of identifying a final control candidate group for determining the control object and control content thereof from the first control candidate group and the second control candidate group.

According to the voice recognition program described above, it is possible to cause a computer to execute a process which may obtain effects as described in the voice recognition device of the above-described invention.

BRIEF DESCRIPTION OF THE DRAWINGS

FIG. 6 is another explanatory diagram of the first parsing process of FIG. 5;

FIG. 7 is an explanatory diagram of an identification process of a control object which is parsed by the second parsing process of FIG. 3;

FIG. 8 is an explanatory diagram of the second parsing process of FIG. 3;

FIG. 9 is a flow chart of a voice interaction process performed by a voice recognition device according to a second embodiment of the present invention; and FIG. 10 is an explanatory diagram of a judging process which judges whether a second control candidate is contradictory to a first control candidate group in the voice interaction process of FIG. 9.

DETAILED DESCRIPTION OF THE PREFERRED EMBODIMENTS

Hereinafter, the preferred embodiments of the present invention will be explained with reference to the drawings.

A first embodiment of the present invention will be described with reference to FIG. 1 to FIG. 8.

Figure 1:
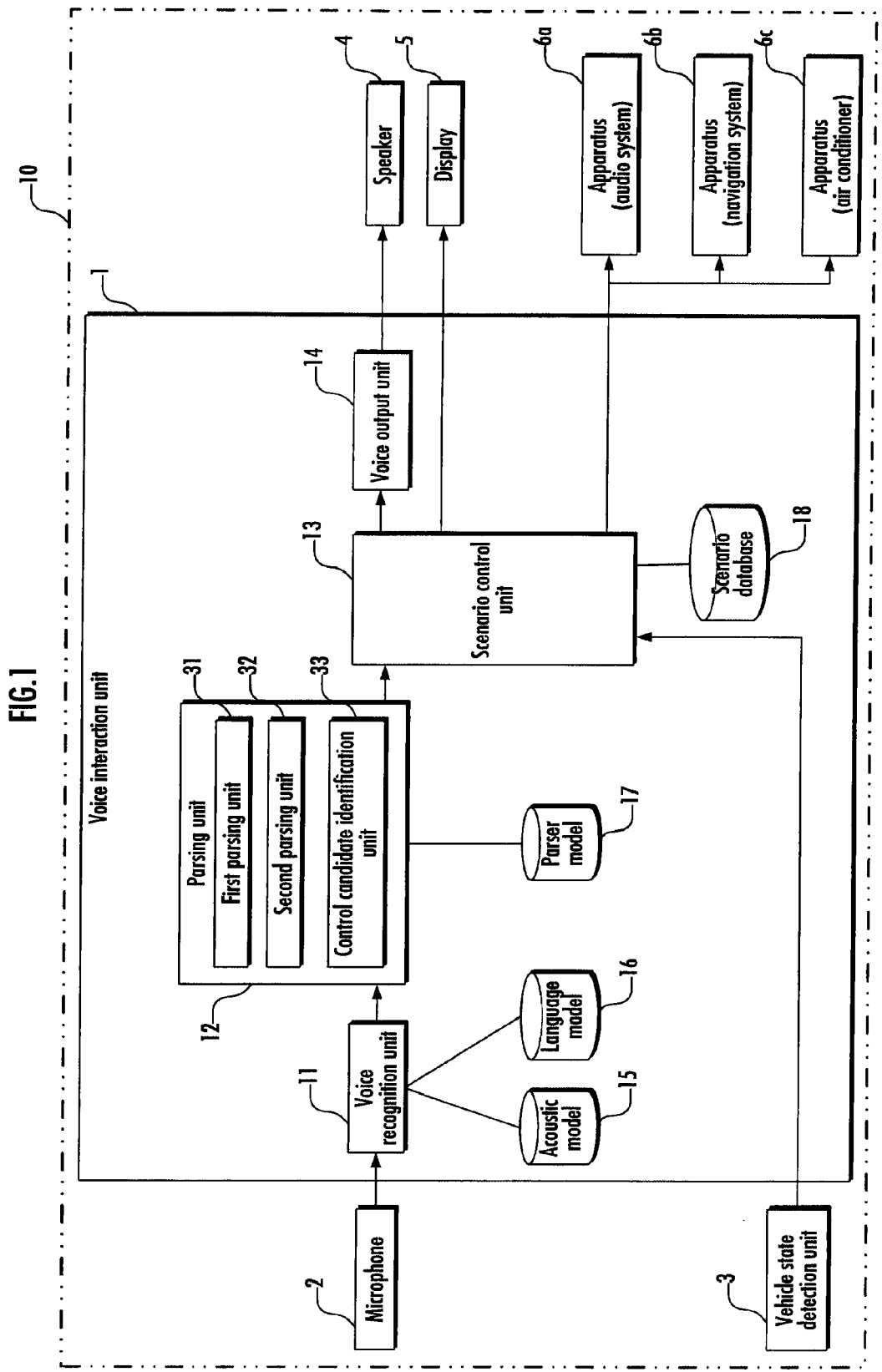
FIG. 1 is a functional block diagram of a voice recognition device according to a first embodiment of the present invention.

As illustrated in FIG. 1, the voice recognition device according to the first embodiment of the present invention includes a voice interaction unit 1 mounted to a vehicle 10. The voice interaction unit 1 is connected with a microphone 2 to which a verbal command from a driver is input, a vehicle state detection unit 3 that detects a state of the vehicle 10, a speaker 4 which outputs a response to the driver, a display 5 which provides information displayed to the driver, and a plurality of apparatuses 6a to 6c which can be operated by the driver via verbal command and the like.

The microphone 2, to which verbal commands by the driver of the vehicle 10 are input, is disposed in a predefined position in the vehicle. When initiation of voice input is instructed from the driver by operating, for example, a talk switch, the microphone 2 obtains the input voice as speech from the driver. The talk switch is an ON/OFF switch which may be operated by the driver of the vehicle 10, and the initiation of voice input is started by pressing the talk switch to ON.

The vehicle state detection unit 3 is a sensor, or the like, detecting the state of the vehicle 10. Herein, the state of the vehicle 10 refers to, for example, running conditions of the vehicle 10 such as speed, acceleration and deceleration; as well as the driving conditions, vehicle location, road conditions, and the like of the vehicle 10; a working state of an apparatus (e.g., a wiper, a turning signal, an audio system 6a, a navigation system 6b, and the like) mounted to the vehicle 10; or an interior state, such as the inner temperature of the vehicle 10. In detail, for example, a vehicle speed sensor detecting the running speed of the vehicle 10 (vehicle speed), a yaw rate sensor detecting yaw rate of the vehicle 10, or a brake sensor detecting brake operations of the vehicle 10 (whether a brake pedal is operated or not) may serve as the sensor detecting the running state of the vehicle 10. Furthermore, a driver's state of the vehicle 10 (palm perspiration, driving load or the like of the driver) may be detected as the state of the vehicle 10.

The speaker 4 outputs a response (an audio guide) to the driver of the vehicle 10. A speaker included in the audio system 6a, which will be described hereinbelow, may serve as the speaker 4.

The display 5 may be, for example, a head-up display (HUD), displaying information such as an image on a front window of the vehicle 10, a display provided integrally with a meter for displaying the running conditions of the vehicle 10, such as speed, or a display provided in the navigation system 6b, which will be described hereinbelow. In the present embodiment, the display of the navigation system 6b is a touch panel having a touch switch mounted therein.

The apparatuses 6a to 6c are the audio system 6a, the navigation system 6b, and an air conditioner 6c, which are mounted to the vehicle 10. For each of the apparatuses 6a to 6c, there are provided functions and operations with predefined controllable elements (devices, contents or the like).

The audio system 6a is provided with a CD player, an MP3 player, a radio, a speaker and the like as its devices. The audio system 6a has "sound volume" and others as its functions, and "change", "on", "off" and others as its operations. Further, the operations of the CD player and MP3 player include "play", "stop" and others. The functions of the radio include "channel selection" and others. The operations related to "sound volume" include "up", "down" and others.

The navigation system 6*b* has "image display", "route guidance", "POI search" and others as its contents. The operations related to the image display include "change", "zoom in", "zoom out" and others. The route guidance is a function to guide a user to a destination via audio guiding or the like. The POI search is a function to search for a destination, such as a restaurant or a hotel.

The air conditioner 6*c* has "air volume", "preset temperature" and others as its functions. Furthermore, the operations of the air conditioner 6*c* include "on", "off" and others. The operations related to the air volume and preset temperature include "change", "up", "down" and others.

The apparatuses 6*a* to 6*c*, respectively, are controlled by designating the information (type of the apparatus or function, content of the operation, or the like) for controlling an object. The devices, contents and functions of each of the apparatuses 6*a* to 6*c* are categorized into a plurality of domains as the control objects. The term "domain" is a classification representing a category corresponding to the contents of an object to be recognized. In particular, the term "domain" refers to the control object, such as an apparatus or function. The domains may be designated in a hierarchical manner; for example, the "audio" domain is classified into sub-domains of "CD player" and "radio".

The voice interaction unit 1 is an electronic unit that includes the following features, which are not illustrated: an A/D conversion circuit converting input analog signals to digital signals, a memory storing voice data, and a computer (an arithmetic processing circuit having a CPU, a memory, an input/output circuit and the like, or a microcomputer having those functions aggregated therein) which has an interface circuit for accessing (reading and writing) the voice data stored in the memory and performs various arithmetic processes on the voice data. In addition, the memory in the computer, or an external storage medium, may be used as a memory for storing voice data.

An output (analog signals) from the microphone 2 is input to the voice interaction unit 1 and is converted by the A/D conversion circuit to digital signals. The voice interaction unit 1 performs a recognition process on a verbal command from the driver on the basis of the input data, and thereafter, based on a recognition result of the recognition process, the voice interaction unit 1 performs processes like interacting with the driver, providing information to the driver via the speaker 4 or the display 5, or controlling the apparatuses 6*a* to 6*c*.

The aforementioned processes may be implemented when a program, which is pre-installed in the memory of the computer, is executed by the computer. The program includes a voice recognition program of the present invention. In addition, it is preferable for the program to be stored in the memory via a recording medium such as, for example, a CD-ROM or the like. It is also preferable for the program to be distributed or broadcast from an external server via a network or satellite and received by a communication apparatus mounted to the vehicle 10 and then stored in the memory.

More specifically, the voice interaction unit 1 includes, along with the functions implemented by the above program, a voice recognition unit 11 which uses an acoustic model 15 and a language model 16 to recognize the input voice and output the recognized input voice as a recognized text, a parsing unit 12 which uses a parser model 17 to comprehend from the recognized text the meaning of the speech, a scenario control unit 13 which uses a scenario database 18 to determine a scenario based on a control candidate identified from the recognition result of the speech and responds to the driver or controls the apparatus or the like, and a voice output unit 14 which outputs an audio response to the driver via the speaker 4. Herein, a control candidate is equivalent to a control object candidate or a control content candidate identified from the recognition result of the speech.

Furthermore, the parsing unit 12 includes the following functions: a first parsing unit 31, a second parsing unit 32, and a control candidate identification unit 33. The first parsing unit 31 parses the text recognized by the voice recognition unit 11 and performs an identification process of the first control candidate group (a first parsing process). The second parsing unit 32 parses the text with respect to the control objects which are among the predefined types of control objects, but not included in the first control candidate group, and performs an identification process of the second control candidate group (a second parsing process). The control candidate identification unit 33 identifies a final control candidate group for determining a control candidate from the control candidates of the first and second control candidate groups.

Each of the acoustic model 15, the language model 16, the parser model 17, and the scenario database 18 is a recording medium (database) such as a CD-ROM, DVD, HDD and the like, having data recorded thereon.

The voice recognition unit 11 performs a frequency analysis on waveform data identifying the voice of the verbal command input to the microphone 2 and extracts a feature vector (frequency feature quantity vector) therefrom. Thereby, the voice recognition unit 11 carries out a voice recognition process in which it identifies the verbal command input based on the extracted feature vector and outputs the identified verbal command as a text expressed by a series of words (a word sequence). Herein, the term "text" refers to a meaningful syntax which is expressed with a series of words and has predefined designations. The voice recognition process is performed by executing a comprehensive determination of the acoustic and linguistic features of the input verbal command by using a probability and statistical method, which is described below.

In other words, the voice recognition unit 11 firstly uses the acoustic model 15 to evaluate the likelihood of each phonetic data corresponding to the extracted feature vector (hereinafter, the likelihood of phonetic data will be referred to as "sound score," where appropriate), to determine the phonetic data according to the sound score. Further, the voice recognition unit 11 uses the language model 16 to evaluate the likelihood of each text that is expressed with a series of words corresponding to the determined sound data (hereinafter, this likelihood of text will be referred to as "language score," where appropriate), to determine the text according to the language score. Furthermore, the voice recognition unit 11 calculates a voice recognition confidence factor for every one of the determined texts based on the sound score and the language score of the text (hereinafter, the confidence factor will be referred to as "voice recognition score," where appropriate). The voice recognition unit 11 then outputs, as a recognized text, any text expressed by a series of words having a voice recognition score that fulfills a predefined condition.

The parsing unit 12, using the parser model 17, performs the first parsing process and the second parsing process to comprehend the meanings of the input verbal commons from the text which has been recognized by the voice recognition unit 11. The first parsing process and the second parsing process are performed by analyzing the relation between words (syntax) in the recognized text by the voice recognition unit 11, and accomplishes such by using a probability and statistical method described below.

In other words, in the first parsing process and the second parsing process, the parsing unit 12 evaluates the likelihood of the recognized text (hereinafter the likelihood of recognized text will be described as "parsing score," where appropriate), and determines a text categorized into a class (hereinafter a text categorized into a class will be referred to as "categorized text"), corresponding to the meaning of the recognized text based on the parsing score. Herein, the term "class set" corresponds to the classification according to the category representing the control object or the control content, like the domain described above.

More specifically, the parsing unit 12 performs the first parsing process on the recognized text by the voice recognition unit 11 by using the entire parser model 17 and identifies as the first control candidate group the categorized text having the parsing score fulfilling a predefined condition. Further, the parsing unit 12 performs the second parsing process on the recognized text by the voice recognition unit 11 by using only partial data which is included in the parser model 17, but not included in the first control candidate group, and is categorized into a domain fulfilling the predefined condition, and then identifies as the second control candidate group the categorized text having the parsing score fulfilling the predefined condition.

The parsing unit 12 excludes from the second control candidate group any control candidate whose control object cannot be identified in connection with the control candidates obtained from the second parsing process result. The parsing unit 12 then identifies, from the first and second control candidate groups, the final control candidate group for determining the control candidate and outputs the identified final control candidate group together with the parsing score thereof.

The scenario control unit 13 uses the data recorded in the scenario database 18 to determine a scenario for a response output to the driver or for the apparatus control based on the identified control candidate and the state of the vehicle 10 obtained from the vehicle state detection unit 3. The scenario database 18 is preliminarily recorded therein with a plurality of scenarios for the response output or apparatus control together with the control candidate or the state of the vehicle. The scenario control unit 13 performs the control process of a response by voice or image display, or the control process of an apparatus. More specifically, for a response by voice, for example, the scenario control unit 13 determines the content of the response to be output (a response sentence for prompting the driver to provide the next verbal command, or a response sentence for informing the user of completion of an operation or the like), and output speed or sound volume for outputting the response.

Via the speaker 4, the voice output unit 14 outputs the response sentence determined by the scenario control unit 13 in accordance with the speed and sound volume thereof. It is possible for the voice output unit 14 to synthesize voice by using, for example, a TTS (Text to Speech) processing method or the like.

The acoustic model 15 is recorded therein with data indicating a probability of occurrence between the data and the feature vector. In detail, the acoustic model 15 is provided with a plurality of models corresponding, respectively, to recognized units (phoneme). The acoustic model, i.e., Hidden Markov Model (HMM), is generally known. HMM is a statistical signal source model that represents voice as a variation of a stationary signal source (state) and expresses it with a transition probability from one state to another. With HMM, it is possible to express an acoustic feature of the voice changing in a time series with a simple probability model. The parameter of HMM, such as the transition probability or the like, is predetermined through training by providing corresponding voice data for learning.

The language model 16 includes data recorded therein indicating an appearance probability and a connection probability of a word acting as a recognition object, together with the phonetic data and text of the word. The word as the recognition object is preliminarily determined as a word that would likely be used in the verbal command for controlling an object. The appearance probability and connection probability of a word are statistically generated by analyzing a large volume of training text corpus. For example, the appearance probability of a word is calculated based on the appearance frequency of the word in the training text corpus.

For the language model 16, a language model of N-gram, for example, is used. The N-gram language model expresses a specific N numbers of words that appear consecutively with a probability. In the present embodiment, the N-grams corresponding to the number of words included in the voice data are used as the language model 16. For example, in a case where the number of words included in the voice data is two, a uni-gram (N=1) expressed as an appearance probability of one word, and a bi-gram (N=2) expressed as an occurrence probability for a series of two words (i.e., a conditional appearance probability for the preceding word) or a two-word sequence are used.

In addition, N-grams may be used for the language model 16 by restricting the N value to a predefined upper limit. For example, a predefined value (N=2), or a subsequently set value wherein the process time for the input speech is within a predefined time, may be used as the predefined upper limit. For example, when the N-grams having N=2 as the upper limit is used, only the uni-gram and the bi-gram are used, even if the number of words included in the phonetic data is greater than two. As a result, it is possible to prevent the arithmetic cost for the voice recognition process from becoming too much, and, thus, to output a response to the verbal command from the driver in an appropriate response time.

The parser model 17 is recorded therein with data indicating an appearance probability and a connection probability of a word as a recognition object, together with the text and class of the word. For example, the language model of N-grams may be used in the parser model 17, as in the case of the language model 16. In the present embodiment specifically, the N-grams having N=3 as the upper limit where N is not greater than the number of words included in the recognized text are used in the parser model 17. For example, for the parser model 17, a uni-gram, a bi-gram, and a tri-gram (N=3) expressed as an occurrence probability of a series of three words, i.e., a three-word sequence (i.e., a conditional appearance probability for the preceding two words) are used. It should be noted that the upper limit may be set arbitrarily and is not restricted to three. It is also possible to use the N-grams having an N value not greater than the number of words included in the recognized text without restricting the upper limit.

Figure 2:
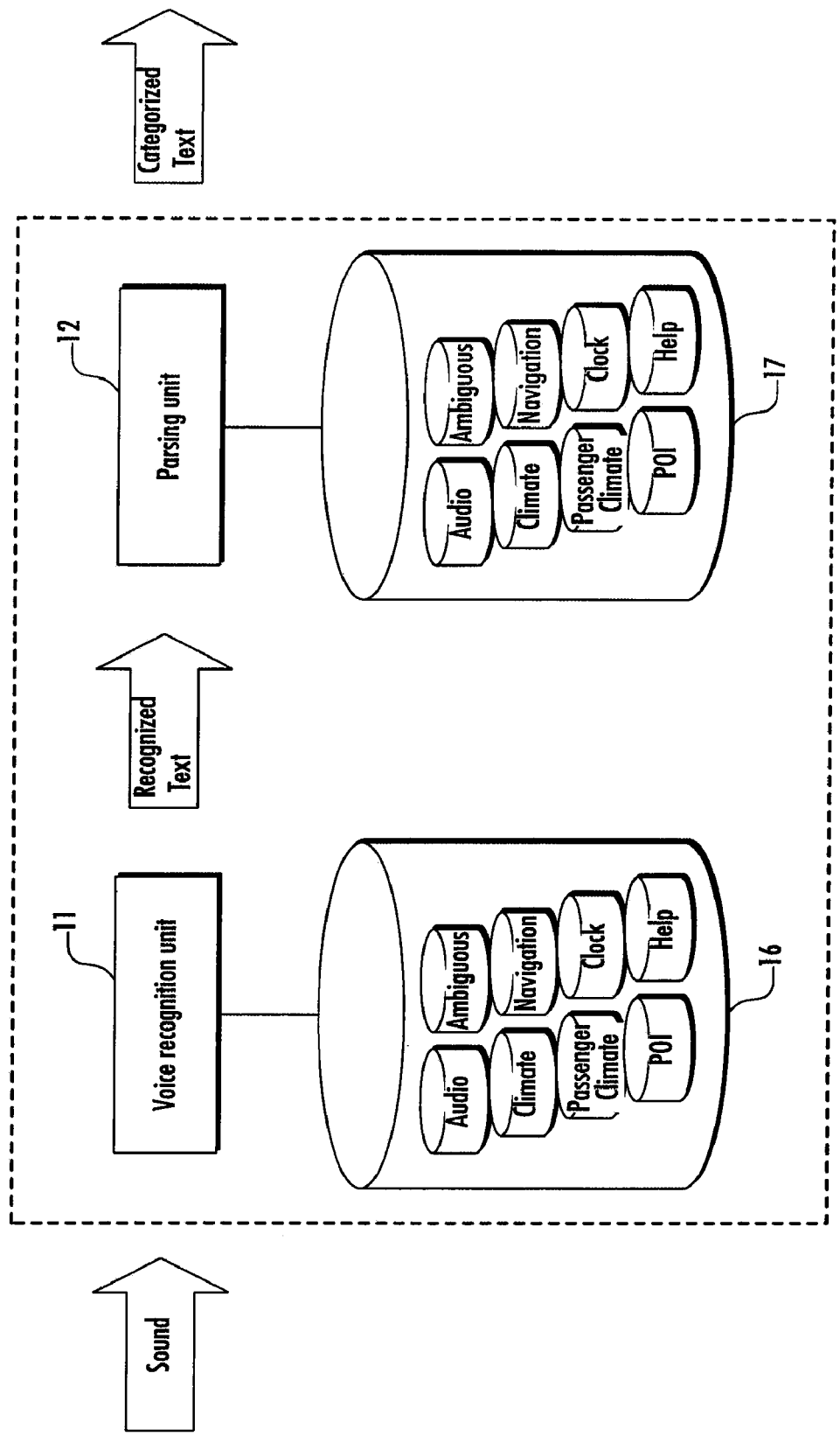
FIG. 2 is a diagram of a language model and a parser model provided in the voice recognition device of FIG. 1.

As illustrated in FIG. 2, the language model 16 and the parser model 17 have data stored therein that is categorized into domain types, respectively. In the example illustrated in FIG. 2, the domain types include eight types of "Audio", "Climate", "Passenger Climate", "POI", "Ambiguous", "Navigation", "Clock" and "Help". "Audio" indicates that the control object is the audio system 6a. "Climate" indicates that the control object is the air conditioner 6c. "Passenger Climate" indicates that the control object is the air conditioner 6c nearest the passenger seat. "POI" indicates that the control object is the POI search function of the navigation system 6b.

"Navigation" indicates that the control object is the function of the route guidance or map operation of the navigation system 6b. "Clock" indicates that the control object is the function of a clock. "Help" indicates that the control object is the help function for giving operation method for any of the apparatuses 6a to 6c, or the voice recognition device. "Ambiguous" indicates that the control object is not clear.

Figure 3:
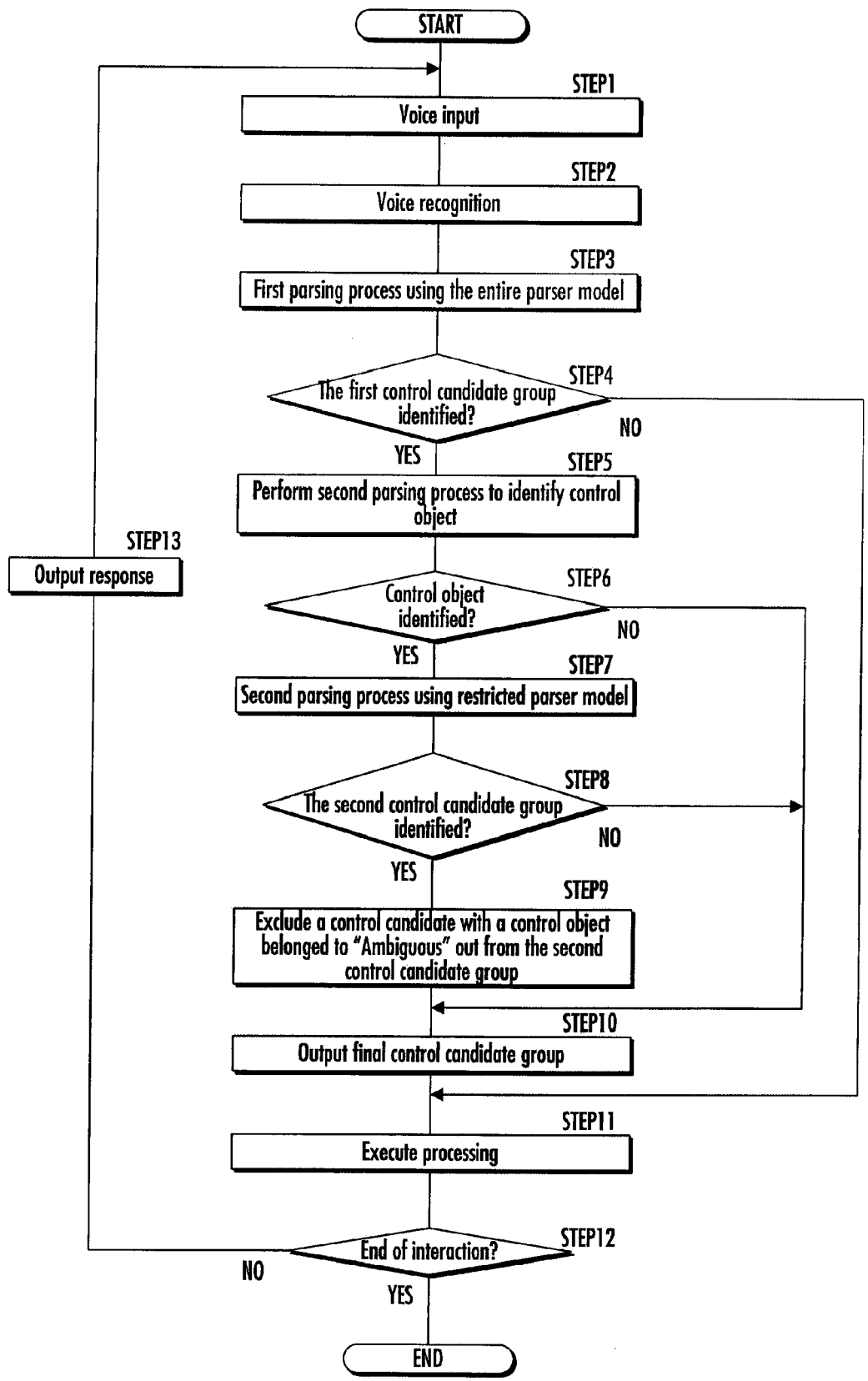
FIG. 3 is a flow chart of a voice interaction process performed by the voice recognition device of FIG. 1.

Hereinafter, according to the present embodiment, an operation (voice interaction process) of the voice recognition device will be described. As illustrated in FIG. 3, in STEP 1, a verbal command for controlling an object is input to the microphone 2 from the driver of the vehicle 10. More specifically, the driver turns ON the talk switch to instruct initiation of verbal command input, and then inputs the verbal command via the microphone 2.

In STEP 2, the voice interaction unit 1 performs the voice recognition process to recognize the input verbal command and output the recognized input verbal command as the recognized text.

Firstly, the voice interaction unit 1 converts the input verbal command via the microphone 2 from analog signals to digital signals and obtains waveform data representing the voice. Then, the voice interaction unit 1 performs a frequency analysis on the waveform data and extracts the feature vector thereof. As such, the waveform data is subjected to a filtering process by, for example, a method of short-time spectrum analysis, and converted into a time series of feature vectors. The feature vector is an extract of a feature value of the sound spectrum at a point in time, which is generally from 10 to 100 dimensions (e.g., 39 dimensions), and a Linear Predictive Coding Mel Cepstrum coefficient is used.

Next, with respect to the extracted feature vector, the voice interaction unit 1 evaluates the likelihood (sound score) of the feature vector for each of the plurality of HMMs recorded in the acoustic model 15. Then, the voice interaction unit 1 determines the phonetic data corresponding to an HMM with a high sound score among the plurality of HMMs. In this manner, when the input speech is, for example, "Chicago", the phonetic data of "shi-ka-go" is obtained from the waveform data of the voice, together with the sound score thereof. When the input speech is "New York", not only the phonetic data of "noo york", but also the phonetic data having a high degree of similarity acoustically, such as "noo ark", are obtained together with the sound scores thereof.

Next, the voice interaction unit 1 uses all of the data stored in the language model 16 to determine a text expressed in a series of words from the determined phonetic data which is based on the language score of the text. When a plurality of phonetic data has been determined, texts are, respectively, determined for the corresponding phonetic data.

Figure 4:
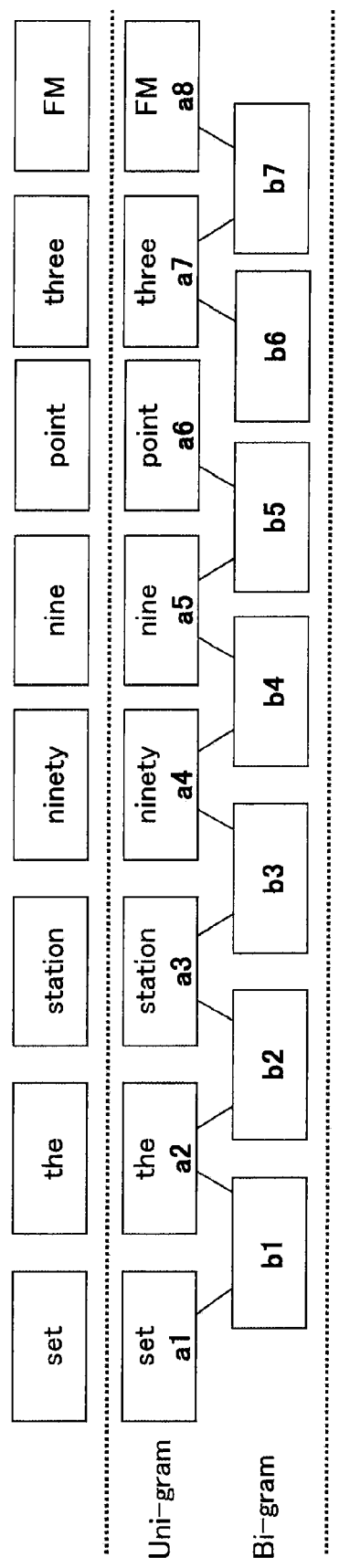
FIG. 4 is an explanatory diagram of a voice recognition process using the language model in the voice interaction process of FIG. 3.

Specifically, the voice interaction unit 1 compares the determined phonetic data with the phonetic data recorded in the language model 16 to extract a word with a high degree of similarity. Next, the voice interaction unit 1 calculates the language score of the extracted word using the N-grams corresponding to the number of words included in the phonetic data. The voice interaction unit 1 then determines a text having the calculated language score fulfilling a prescribed condition for each word in the phonetic data (for example, not less than a predefined value). For example, as illustrated in FIG. 4, in the case where the input verbal command is "Set the station ninety nine point three FM.", "set the station ninety nine point three FM" is determined as the text corresponding to the phonetic data determined from the input verbal command.

At this time, appearance probabilities a1-a8 of the respective words "set", "the", . . . , "FM" are provided in the uni-gram. In addition, occurrence probabilities b1-b7 of the respective two-word sequences "set the", "the station", . . . , "three FM" are provided in the bi-gram. Similarly, for the exemplary situations where N=3 to 8, the occurrence probabilities of N-word sequences c1-c6, d1-d5, e1-e4, f1-f3, g1-g2 and h1 would be provided, although none are illustrated herein. For example, the language score of the text "ninety" is calculated based on a4, b3, c2 and d1 obtained from the N-grams of N=1 to 4 in accordance with the number of words (four), which is the sum of the word "ninety" and the preceding three words included in the phonetic data.

Thus, the use of such a method of dictating the input verbal command as a text using a probability and statistical language model for each word enables recognition of a spontaneous verbal command from the vehicle driver, and without being restricted to verbal commands having predetermined expressions.

Next, for every one of the determined texts, the voice interaction unit 1 calculates a weighted sum of the sound score and the language score as a confidence factor of voice recognition (voice recognition score). As a weighted coefficient, for example, an experimentally predetermined value may be used.

Next, the voice interaction unit 1 determines and outputs the text expressed by a series of words with the calculated voice recognition score fulfilling a predefined condition as a recognized text. For example, the predefined condition is set to be a text having the highest voice recognition score, texts having the voice recognition scores down to a predefined rank from the top, or texts having the voice recognition scores of not less than a predefined value.

Next, in STEP 3 to STEP 10, the voice interaction unit 1 performs the parsing process so as to comprehend the meaning of the verbal command from the recognized text.

In STEP 3, the voice interaction unit 1 uses the entire data of the parser model 17 to perform the first parsing process in which the categorized text is determined from the recognized text. More specifically, the voice interaction unit 1 initially uses the entire data of the parser model 17 to calculate the likelihood of a respective domain for one word for each word included in the recognized text. Then, the voice interaction unit 1 determines the respective domain for one word according to the calculated likelihood. The voice interaction unit 1 uses the partial data categorized into the determined domain type, respectively, from the entire data of the parser model 17 to calculate the likelihood of a respective class set (categorized text) for one word. Then, the voice interaction unit 1 determines the categorized text for one word based on the word score.

Similarly, for a respective series of two words included in the recognized text, the voice interaction unit 1 calculates the likelihood of a respective domain for the series of two words and determines the respective domain for the series of two words based on the likelihood. Then, the voice interaction unit 1 calculates the likelihood (two-word score) for a respective class set (categorized text) for two-words and determines the categorized text based on the two-word score. Similarly, for a respective series of three words included in the recognized text, the voice interaction unit 1 calculates the likelihood of a respective domain for the series of three words and determines the respective domain for the series of three words based on the likelihood. Then, the voice interaction unit 1 calculates the likelihood (three-word score) for a respective class set (categorized text) and determines the categorized text based on the three-word score.

Next, the voice interaction unit 1 calculates the likelihood (parsing score) of a respective class set for the entire recognized texts, based on the respective class set determined for one word, two-word sequence, and three-word sequence, and the word score (one-word score, two-word score, three-word score) of the respective class set. The voice interaction unit 1 then determines the class set (categorized text) for the entire recognized text based on the parsing score.

Figure 5:
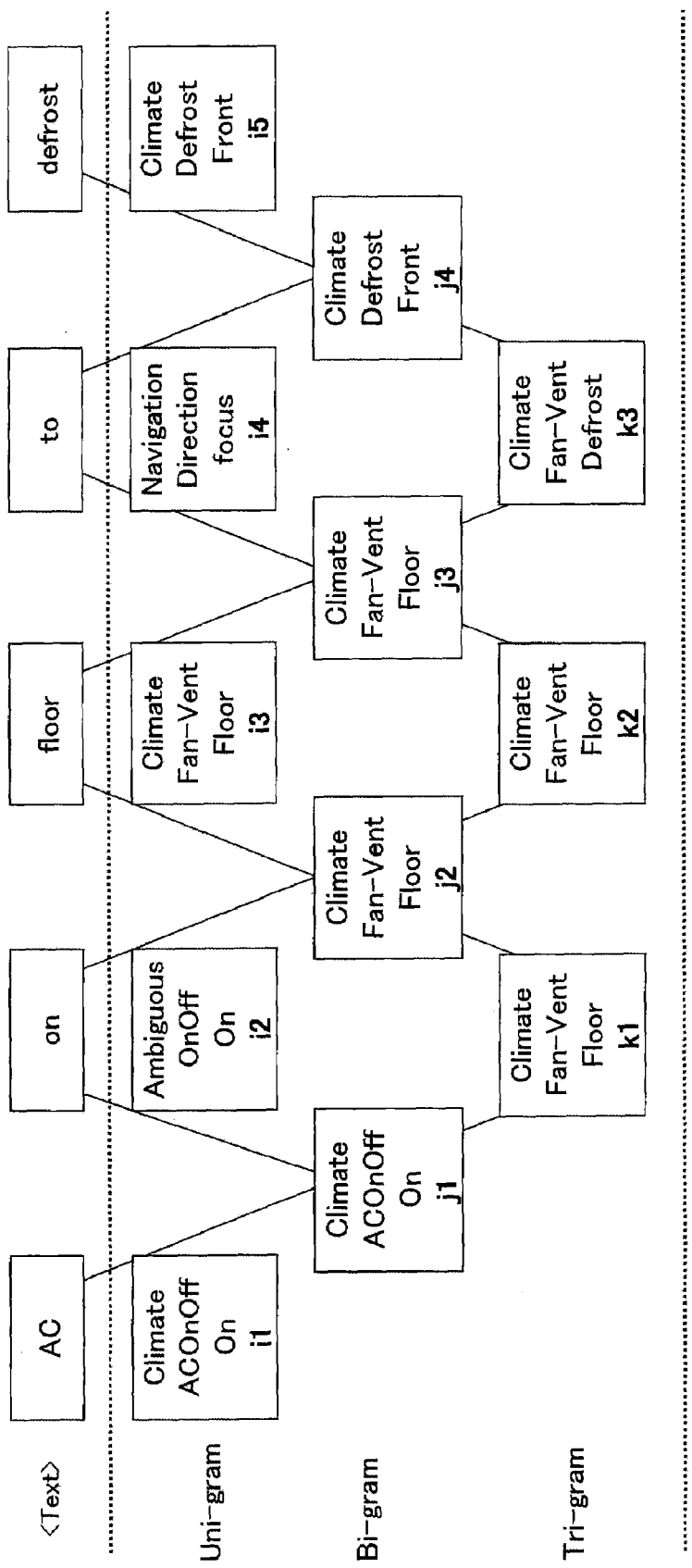
FIG. 5 is an explanatory diagram of a first parsing process in the voice interaction process of in FIG. 3.

Herein, the process of determining a categorized text using the parser model 17 will be described with reference to the example illustrated in FIG. 5. In the example of FIG. 5, the recognized text is "AC on floor to defrost".

At this time, for each of the words "AC", "on", . . . , "defrost", the entire parser model 17 is used to calculate in the uni-gram the likelihood of a respective domain for one word. Then, the domain for the one word is determined based on the likelihood. For example, the domain at the top place (having the highest likelihood) is determined as {Climate} for "AC", {Ambiguous} for "on", and {Climate} for "defrost".

Further, for "AC", "on", . . . , "defrost", using the partial data in the parser model 17 categorized into the respective determined domain types, the likelihood of a respective class set for one word is calculated in the uni-gram. Then, the class set for the one word is determined based on the likelihood or one-word score. For example, for "AC", the class set at the top place (having the highest likelihood) is determined as {Climate_ACOnOff_On}, and the likelihood (word score) i1 for this class set is obtained. Similarly, the class sets are determined for "on", . . . , "defrost", and the likelihoods (word scores) i2-i5 for the respective class sets are obtained.

Similarly, for each of "AC on", "on floor", . . . , "to defrost", the likelihood of a respective domain for a two-word sequence is calculated in the bi-gram, and the domain for the two-word sequence is determined based on the likelihood or two-word score. Then, the class sets for the respective two-word sequences and their likelihoods (two-word scores) j1-j4 are determined. Further, the likelihood of a respective domain for a three-word sequence is calculated in the tri-gram for each of "AC on floor", "on floor to", and "floor to defrost", and the domain for the three-word sequence is determined based on the likelihood or three-word score. Then, the class sets for the respective three-word sequences and the likelihoods (three-word scores) thereof k1-k3 are determined.

Next, for each of the class sets determined for one word, two-word sequence and three-word sequence, a sum of the one-word score(s) i1-i5, a sum of the two-word score(s) j1-j4 and a sum of the three-word score(s) k1-k3 for the corresponding class set is calculated as the likelihood (parsing score) of the class set for the entire text. For example, the parsing score for {Climate_Fan-Vent_Floor} is i3+j2+j3+k1+k2. Further, the parsing score for {Climate_ACOnOff_On} is i1+j1, and the parsing score for {Climate_Defrost_Front} is i5+j4. Then, the class sets (categorized texts) for the entire text are determined based on the calculated parsing scores. In this manner, the categorized texts such as {Climate_Defrost_Front}, {Climate_Fan-Vent_Floor} and {Climate_ACOnOff_On} are determined from the recognized text.

Next, based on the recognition result of the input verbal command, the voice interaction unit 1 determines any categorized text having a calculated parsing score fulfilling the predefined condition as a control candidate and outputs the determined control candidate together with a confidence factor (parsing score) thereof. The predefined condition is set to be, for example, a text having the highest voice recognition score, texts having the voice recognition scores down to a predefined rank from the top, texts having the voice recognition scores of not less than a predefined value. For example, in the case where "AC on floor to defrost" is input as the input speech as described above, {Climate_Defrost_Front} will be output as a first control candidate, together with the parsing score thereof.

Hereinafter, the first parsing process will be described with reference to the example illustrated in FIG. 6. As illustrated in the example in FIG. 6, the recognized text is "Turn on the radio and temperature up". In other words, at one time speech, there are two commands, that is, one command of "turn on the radio of the audio system 6*a*" and the other command of "turn up the temperature of the air conditioner 6*c*", are input via a verbal command.

At this time, similar to the example illustrated in FIG. 5, the one-word score, two-word score and three-word score are calculated by using the entire parser model 17, and class sets for respective one word, two-word sequence and three-word sequence are determined. Therefore, parsing scores are calculated for these class sets respectively, and the categorized texts are determined. In the example as illustrated in FIG. 6, the circled text of "Audio_Radio_On" is determined as a first control candidate and the determined first control candidate is output together with the parsing score thereof. In this manner, among commands from voice input at one time, the command of "turn on the radio of the audio system 6*a*," having more remarkable features, is identified as the first control candidate.

In STEP 4, the voice interaction unit 1 judges whether the first control candidate group has been identified in STEP 3. If the judging result in STEP 4 is NO (i.e., no first control candidate has been identified), the voice interaction unit 1 will not perform the second parsing process and identification process of the final control candidate group, and the process proceeds to STEP 11.

If the judging result in STEP 4 is YES (i.e., the first control candidate group has been identified), the process proceeds to STEP 5 and the voice interaction unit 1 performs the identification process of the control object which will be parsed in the second parsing process. More specifically, the voice interaction unit 1 initially identifies a control object, which is included in the predefined types of control objects but is not included in the first control candidate group. Then, the voice interaction unit 1 calculates a word score sum for the control object in the recognized text. The voice interaction unit 1 then divides the sum by the number of words for each control object included in the recognized text and uses the result of the division as an index value for identifying the control object (an average word score for every word of each control object included in the recognized text). Thus, a control object having a calculated index value not smaller than a predefined threshold value is identified as the control object for the second parsing process.

The identification process of the control object described above will be described hereinafter with reference to the example illustrated in FIG. 7. The text shown in FIG. 7 is the same as the text shown in FIG. 6. In this case, the first control candidate is identified as "Audio_Radio_On"; and "Ambiguous", "Navigation", and "Climate", except for "Audio", are identified as the control object. In addition, for the control objects of "Ambiguous", "Navigation" and "Climate", index values for identifying the control objects are calculated as 0.127, 0.05 and 0.4, respectively. Thereby, if the predefined threshold value is set to 0.2, the control object for the second parsing process is identified as "Climate".

In STEP 6, the voice interaction unit 1 judges whether the control object for the second parsing process has been identified in STEP 5. If the judging result in STEP 6 is NO (i.e., no control object has been identified), the voice interaction unit 1 will not perform the second parsing process and the process proceeds to STEP 10.

If the judging result in STEP 6 is YES (i.e., the control object has been identified), the process proceeds to STEP 7, and the voice interaction unit 1 performs the second parsing process for understanding the meaning of the text by using the data categorized according to the control object identified in STEP 5. In the example illustrated in FIG. 7, in addition to the data categorized into the domain of "Climate", the data categorized into the domain of "Ambiguous", having a common word between the control objects, is also used in the second parsing process. The detail of the second parsing process is the same as that of the first parsing process described in STEP 3. Thereby, a control object having a parsing score not smaller than the predefined threshold values is identified as the second control candidate group.

Hereinafter, the second parsing process will be described with reference to the example illustrated in FIG. 7. The text shown in FIG. 7 is the same as the text in FIG. 6. In this case, since the parsing process is focused on the control object "Climate" by only using the data categorized to "Climate" and "Ambiguous" in the parser model 17, the control object(s) related to "Climate" can be properly extracted. Thereby, if the predefined threshold value is set, for example, at 0.6, "Climate_Temperature_Up" will be identified as the second control candidate group.

In STEP 8, the voice interaction unit 1 judges whether the second control object group has been identified in STEP 7. If the judging result in STEP 8 is NO (that is, no second control candidate has been identified), the process proceeds to STEP 10.

If the judging result in STEP 8 is YES (that is, the second control candidate group has been identified), the process proceeds to STEP 9, and the voice interaction unit 1 removes a control candidate out of the second control candidate group if the control candidate whose control object is categorized to "Ambiguous" is included in the second control candidate group.

In STEP 10, the voice interaction unit 1 identifies the final control candidate group from the first and second control candidate groups and outputs the identified final control candidate. More specifically, for example, the control candidate having the highest parsing score in the first control candidate group and the control candidate having the highest parsing score in the second control candidate group are identified and output, respectively, as the top-place control candidate and the second-place control candidate. For the examples illustrated in FIG. 6 to FIG. 8, the output shows "Audio_Radio_On" as the top-place control candidate, and "Climate_Temperature_Up" as the second-place control candidate. In addition, when the second control candidate group is not identified, the final control candidate group will only be identified from the first control candidate and is then output.

In STEP 11, the voice interaction unit 1 performs a process on the control candidate group identified in STEP 10. In this case, for example, if the top-place control candidate and the second-place control candidate are identified, respectively, in STEP 10, two processes will be performed.

Specifically, the voice interaction unit 1 determines a response to the driver or a scenario for controlling an apparatus based on the control candidate group identified in STEP 10, using the data stored in the scenario database 18. At this time, the voice interaction unit 1 obtains a detection value of the state of the vehicle 10 (such as the running conditions of the vehicle, the conditions of the apparatuses mounted to the vehicle 10, and the state of the driver of the vehicle 10) detected by the vehicle state detection unit 3 and determines scenarios reflecting the state of the vehicle 10. Next, if a control candidate is not identified from the recognition result of the verbal command, the voice interaction unit 1 will process the determined scenarios. In addition, in the case where a control candidate is not identified from the recognition result of speech, a scenario for outputting a response sentence inquiring the driver about the control object or control content is determined.

For example, as illustrated in FIG. 6 to FIG. 8, when two control candidates of "Audio_Radio_On" and "Climate_Temperature_Up" have been identified as the final control candidate group in STEP 10, the scenarios for "turning on the radio of the audio system 6a" and "turning up the setting temperature of the air conditioner 6c" are determined and two processes thereof are performed.

In STEP 12, the voice interaction unit 1 determines whether an interaction with the driver has been finished on the basis of the determined scenarios. If the determination result in STEP 12 is NO, the process proceeds to STEP 13, and the voice interaction unit 1 outputs a response sentence via the speaker 4 (such as a response sentence prompting the driver to provide a second verbal command), in accordance with the content of the determined response sentence, as well as the conditions for outputting the response sentence.

The process then returns to STEP 1, where a second verbal command is input from the driver. Thereafter, until the judging result becomes YES in STEP 12, a process identical to that described in STEP 1 to STEP 13 is repeated for the second verbal command.

Finally, the voice interaction process ends in the case where the judging result in STEP 12 is YES. At this time, if a scenario for reporting to a user a completion of an apparatus control or the like has been determined, the voice interaction unit 1 outputs via the speaker 4 a response sentence (such as a response sentence reporting the completion of the apparatus control to the user), in accordance with the content of the determined response sentence, as well as the conditions for outputting the response sentence.

According to the processes described above, it is possible to recognize each command and control a plurality of control objects, even in the case where a plurality of commands are input via a single verbal command from a user.

Hereinafter, a voice recognition device according to a second embodiment of the present invention, will be described with reference to FIG. 9 and FIG. 10. The second embodiment differs from the first embodiment only in that the parsing unit 12 of the second embodiment includes a discrepancy judging unit and a process of the second parsing unit 32 included in the parsing unit 12. In addition, since the configuration of the second embodiment is identical to that of the first embodiment, same reference numerals are used to refer to the same or identical parts in the first embodiment, the descriptions of which are omitted herefrom to avoid redundancy.

In the voice recognition device of the second embodiment, the discrepancy judging unit judges whether each control candidate in the second control candidate group is contradictory to that in the first control candidate group for the control object and control content. Also, the second parsing unit 12 excludes a control candidate from the second control candidate group if the control candidate is judged by the discrepancy judging unit to be contradictory to that in the first control candidate group for the control object and control content thereof. In addition, the parsing unit 12 in the second embodiment is different from that in the first embodiment as the unit 12 will not perform the process of removing a control object that is among the control candidates obtained from the result of the second parsing process and cannot be identified from the second control candidate group. The other configurations of the second embodiment are the same to that of the first embodiment.

Operations of the voice recognition device (voice interaction process) of the second embodiment will be described with reference to FIG. 9. In addition, the voice interaction process differs from that of the first embodiment only in STEP 9 and STEP 10. Thus, STEP 1 to STEP 8 and STEP 11 to STEP 13 illustrated in FIG. 9 are the same as STEP 1 to STEP 8 and STEP 10 to STEP 12 of the first embodiment illustrated in FIG. 3, respectively.

According to the voice interaction process of the second embodiment, the voice interaction unit 1 illustrated in FIG. 9 judges whether each control candidate identified in STEP 7 of the second control candidate group is contradictory to that identified in STEP 3 of the first control candidate group. More specifically, the voice recognition unit 1 performs discrepancy judgment by using predefined data indicating contradictory control candidates, as illustrated in FIG. 10.

If the judging result in STEP 9 is YES (having discrepancy), the process proceeds to STEP 10 and the voice recognition unit 1 excludes a control candidate, which is contradictory to the first control candidate group, from the second control candidate group. Thereafter, the process proceeds to STEP 11 and the final control candidate group is identified from the first and second control candidate groups and outputted. If the judging result in STEP 9 is NO (having no discrepancy), on the other hand, the process simply proceeds to STEP 11. The other operations are the same as those in the first embodiment.

According to the voice recognition device of the second embodiment, similar to that in the first embodiment, it is possible to recognize each command and control a plurality of control objects even in the case where a plurality of commands are input via a single verbal command from a user.

In addition, in the first and second embodiments, the voice recognition device includes the vehicle state detection unit 3 and the scenario control unit 13 for determining a scenario in correspondence with the recognition result of speech and detected state of the vehicle 10. However, it is also preferable for the voice recognition device to include only the scenario control unit 13 for determining a scenario from the recognition result.

Furthermore, according to the first and second embodiments, a user who inputs the verbal command can be the driver of the vehicle 10. However, it is also within the scope of the invention wherein the user can be an occupant other than the driver.

In addition, according to the first and second embodiments, the voice recognition device is mounted to the vehicle 10. It is preferable for the voice recognition device to be mounted to a movable objet other than the vehicle. Further, not limited to a movable object, it is possible for the voice recognition device to be applied in any system where a user controls an object via input of a corresponding verbal command.

The invention claimed is:

1. A voice recognition device comprising a microprocessor for determining a control object and control content thereof from predefined types of control objects and control contents thereof based on a recognition result obtained from input to a voice input unit, comprising:
   a voice recognition unit for converting, via the microprocessor, the input verbal command into a text expressed with a series of words by recognizing the input verbal command;
   a first parsing unit for performing an identification process of identifying a first control candidate group as a control candidate for the control object and control content thereof by parsing the text converted by the voice recognition unit;
   a second parsing unit for performing an identification process of identifying a second control candidate group as a control candidate for the control object and control content thereof by parsing the text converted by the voice recognition unit with respect to control objects which are among the predefined types of control objects but not included in the first control candidate group; and
   a control candidate identification unit for identifying a final control candidate group for determining the control object and control content thereof from the first control candidate group and the second control candidate group.

2. The voice recognition device as claimed in claim 1, wherein the second parsing unit includes a calculation unit for calculating a word score based on features of the words contained in the text converted by the voice recognition unit, and identifies the second control candidate group by parsing the text with respect to the control objects which are among the predefined types of control objects but not included in the first control candidate group arid whose each word score satisfies a predefined condition.

3. The voice recognition device as claimed in claim 2, wherein the second parsing unit calculates an average value of word scores for the words contained in the text and correspond to the control objects respectively, and uses the average value as the predefined condition if the average value is not smaller than a predefined threshold value.

4. The voice recognition device as claimed in claim 1, further comprising a discrepancy judging unit for judging whether the control object and control content of each control candidate in the second control candidate group is contradictory to the control object and control content of the first control candidate group; and the second parsing unit excludes a control candidate from the second control candidate group if the control object and control content of the excluded control candidate is judged by the discrepancy judging unit to be contradictory to the control object and control content of the first control candidate group.

5. The voice recognition device as claimed in claim 1, wherein the second parsing unit excludes a control candidate from the second control candidate group if the excluded control candidate can not be identified with a control object after the identification process performed on the second control candidate group.

6. A computer assisted voice recognition method for determining a control object and control content thereof from predefined types of control objects and control contents based on a recognition result obtained from a verbal command input to a voice input unit, the computer comprising a microprocessor, the method comprising:
   a voice recognition step of converting, via the microprocessor, the input verbal command into a text expressed with a series of words by recognizing the input verbal command; a first parsing step of performing an identification process of identifying a first control candidate group as a control candidate for the control object and control content thereof by parsing the text converted in the voice recognition step;
   a second parsing step of performing an identification process of identifying a second control candidate group as a control candidate for the control object and control content thereof by parsing the text converted in the voice recognition step with respect to control objects which are among the predefined types of control objects but not included in the first control candidate group; and a control candidate identifying step of identifying a final control candidate group for determining the control object and control content thereof from the first control candidate group and the second control candidate group.

7. The voice recognition method as claimed in claim 6, wherein the second parsing step includes a calculation step of calculating a word score based on features of the words contained in the text converted by the voice recognition step, and identifies the second control candidate group by parsing the text with respect to the control objects which are among the predefined types of control objects but not included in the first control candidate group and whose each word score satisfies a predefined condition.

8. The voice recognition method as claimed in claim 7, wherein the second parsing step calculates an average value of word scores for the words contained in the text and correspond to the control objects respectively, and uses the average value as the predefined condition if the average value is not smaller than a predefined threshold value.

9. The voice recognition method as claimed in claim 6, comprising a discrepancy judging step of judging whether the control object and control content of each control candidate in the second control candidate group is contradictory to the control object an control content of the first control candidate group; and the second parsing step excludes a control candidate from the second control candidate group if the control object and control content of the excluded control candidate is judged by the discrepancy judging step to be contradictory to the control object and control content of the first control candidate group.

10. The voice recognition method as claimed in claim 6, wherein the second parsing step excludes a control candidate from the second control candidate group if the excluded control candidate cannot be identified with a control object after the identification process performed on the second control candidate group.

11. A non-transitory computer-readable storage medium with an executable voice recognition program stored thereon, wherein the program causes the computer to execute a process of determining a control object and control content thereof from predefined types of control objects and control contents based on a recognition result obtained from a verbal command input to a voice input unit, having a function to cause the computer to execute:

a voice recognition process for converting the input verbal command into a text expressed with a series of words by recognizing the input verbal command;

a first parsing process of performing an identification process of identifying a first control candidate group as a control candidate for the control object and control content thereof by parsing the text converted by the voice recognition process;

a second parsing process of performing an identification process of identifying a second control candidate group as a control candidate for the control object and control content thereof by parsing the text converted by the voice recognition process with respect to control objects which are among the predefined types of control objects but not included in the first control candidate group; and a control candidate identification process of identifying a final control candidate group for determining the control object and control content thereof from the first control candidate group and the second control candidate group.

\* \* \* \* \*